United States Patent
Harner et al.

(10) Patent No.: US 10,896,036 B2
(45) Date of Patent: Jan. 19, 2021

(54) AUTO MAPPING RECOMMENDER

(71) Applicant: MuleSoft, LLC, San Francisco, CA (US)

(72) Inventors: Soren James Harner, Palo Alto, CA (US); Martin Gaston Podavini Rey, Buenos Aires (AR); Badi Azad, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 26 days.

(21) Appl. No.: 16/394,805

(22) Filed: Apr. 25, 2019

(65) Prior Publication Data

US 2019/0332374 A1 Oct. 31, 2019

Related U.S. Application Data

(60) Provisional application No. 62/662,428, filed on Apr. 25, 2018.

(51) Int. Cl.
*H01F 38/14* (2006.01)
*B60L 1/00* (2006.01)
*H01F 37/00* (2006.01)
*H02J 5/00* (2016.01)
*G06F 8/70* (2018.01)
*G06F 8/10* (2018.01)
*G06F 8/41* (2018.01)
*G06N 3/08* (2006.01)

(52) U.S. Cl.
CPC .................. *G06F 8/70* (2013.01); *G06F 8/10* (2013.01); *G06F 8/42* (2013.01); *G06F 8/433* (2013.01); *G06N 3/08* (2013.01)

(58) Field of Classification Search
CPC ...... G06F 8/20; G06F 8/70; G06F 8/10; G06F 8/42; G06F 2200/12; G06F 8/433; G06F 16/258; G06F 16/88; G06F 16/27; G06F 8/34; G06N 20/00; G06N 3/08; H04L 67/02; B60L 2200/12; B60L 2200/26
See application file for complete search history.

(56) References Cited

U.S. PATENT DOCUMENTS

| | | | |
|---|---|---|---|
| 10,001,975 B2* | 6/2018 | Bharthulwar | G06F 11/3688 |
| 10,304,222 B2* | 5/2019 | Alli | H04L 67/02 |
| 2004/0107201 A1* | 6/2004 | Morris | G06F 16/258 |

OTHER PUBLICATIONS

Guo et al., WMS-Based Flow Mapping Services, 8 pages (Year: 2012).*
Antably et al., Integrating Task Migration Capability in Software Tool-Chain for Data-Flow Applications Mapped on Multi-tiled Architectures, 8 pages (Year: 2015).*

* cited by examiner

*Primary Examiner* — Thuy Dao
(74) *Attorney, Agent, or Firm* — Sterne, Kessler, Goldstein & Fox P.L.L.C.

(57) ABSTRACT

Disclosed herein are system, method, and computer program product embodiments for providing an auto-mapping recommendation between a source asset and a target asset in an integration flow design tool. Because the number of fields passed from a source asset to a target asset may be multitudinous, by auto-recommending mappings between fields provided by the source asset to the target asset, an integration flow design tool may save time developers a significant amount of time and optimize the integration flow design process.

20 Claims, 8 Drawing Sheets

ID
AUTO MAPPING RECOMMENDER

CROSS REFERENCE TO RELATED APPLICATIONS

This application claims the benefit of U.S. Provisional Patent Application No. 62/662,428 by Harner et al, "Auto Mapping Recommender," filed Apr. 25, 2018, which is hereby incorporated by reference in its entirety.

BACKGROUND

Integration platforms allow organizations to design, implement, and deploy software tools that integrate and harness heterogeneous resources (e.g., applications, services, and data sources) from across the organization's technical landscape. An integration platform may build integration applications, retrieve and transform data, interact with various application programming interfaces (APIs), deploy integration applications to users, and otherwise maintain integration applications. Often, an integration application mandates and maintains substantial data flow between complex and disparate systems not originally designed for interoperability.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
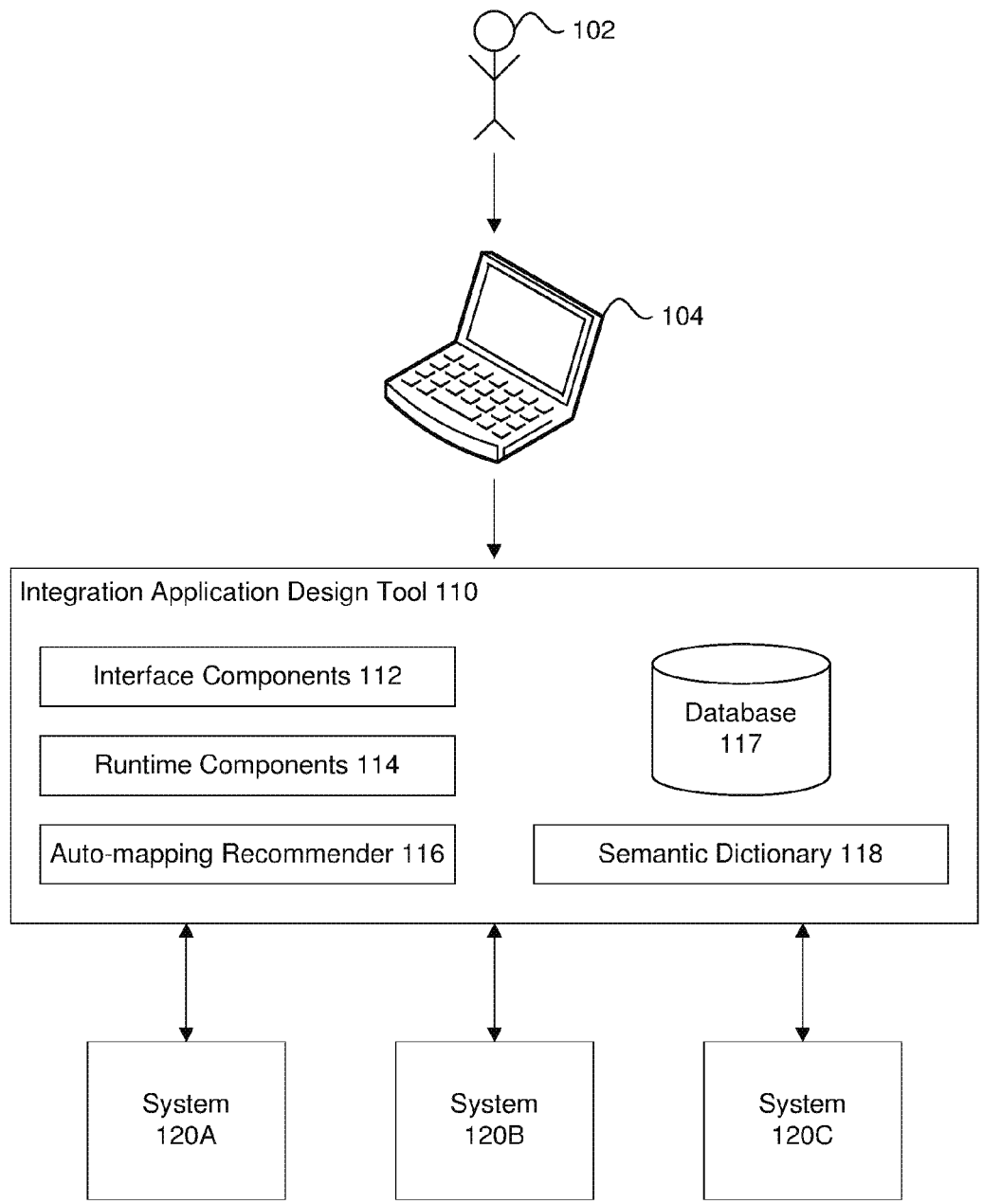
FIG. 1 is a block diagram of an environment including an integration flow design tool, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for providing an auto-mapping recommendation between a source asset and a target asset in an integration flow design tool.

An organization's enterprise landscape may incorporate a wide-array of applications, services, data sources, servers, and other resources. Applications in the landscape may be varied and multitudinous and include: custom-built applications, legacy applications, database applications, cloud-based applications, and enterprise-resource-planning applications, just to name a few examples. These applications and their associated data may reside on different servers in different locations or data centers and/or be accessed via the cloud.

An integration platform may allow users to create useful business processes, applications, and other software tools that will be referred to throughout this disclosure as integration applications, integration scenarios, and/or integration flows. Integration flows may leverage data from the organization's disparate systems and applications. An integration platform may bridge divides between technical resources by centralizing communications. The integration platform may include message buses/protocols to facilitate communication between applications, data flow coordinators, connectors, security and data protection, dashboards and analysis tools, APIs, and other suitable tools.

An integration platform may provide an integration flow design tool that developers may use to build integration flows, applications, and scenarios. The integration flow design tool may provide developers with assets, connectors, operations, API calls, data transformations, and scripting/programming/expression languages and/or other programmatic constructs. By employing the integration flow design tool, a developer may securely and efficiently build, test, deploy, update, and maintain integration applications.

The integration flow design tool may create a visualization of the integration scenario to aid developers implementing integration flows. In the visualization, a developer may view the integration flow in graphical form. The integration flow design tool may allow the developer to update parameters and settings associated with the integration flow within the visualization.

The integration flow design tool may provide pre-built assets that a developer may harness and leverage. An asset may be designed to connect to a particular data source or use a particular data protocol. The integration flow design tool may provide methods of accessing and/or configuring additional details about the assets within the integration flow, for example, by entering server information, security/account information, transport/message protocols, etc.

The integration flow design tool may further allow developers to map fields between assets. In this fashion, fields existing in a first asset may be passed to a second asset for additional manipulation, analysis, use, storage, etc. A developer may link these fields manually to ensure appropriate relationships between the data, i.e., that the appropriate field from the first asset gets passed to an appropriate field of the second asset when the integration application runs.

However, an asset may incorporate a large number of fields, e.g., hundreds or thousands of fields or more for developers to select from and/or to map. Thus, a developer may face enormous difficulty and spend significant time manually mapping fields from a source asset to a target asset. Accordingly, a need exists to provide users with an auto-mapping recommendation in the integration flow design tool that automatically links fields from a source asset to fields of a target asset.

FIG. 1 is a block diagram of environment 100 including an integration flow design tool, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 may include user 102, device 104, integration application design tool 110, and systems 120.

User 102 may be a developer or other individual designing, developing, and deploying integration flows using an integration application design tool in an integration platform. User 102 may be a member of a business, organization, or other suitable group. User 102 may be a human being, but user 102 may also be an artificial intelligence construct. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 1 as a single computer, one skilled in the art(s) will understand that device 104 may represent two or more computers in communication with one another. Therefore, it will also be appreciated that any two or more components of device 104 may similarly be executed using some or all of the two or more computers in communication with one another.

Integration application design tool 110 may allow user 102 to design integration applications that access, manipulate, and otherwise use disparate technical resources. Integration application design tool 110 may provide a graphical design environment so user 102 may build, edit, deploy, monitor, and maintain integration applications. Integration application design tool 110 may provide a drag-and-drop interface that allows user 102 to leverage pre-built assets, security protocols, APIs, programming languages, and other suitable components. Integration application design tool 110 may standardize access to various data sources, provide connections to third-party systems and data, and provide additional functionalities to further integrate data from a wide-array of organizational and on-the-cloud data sources. Integration application design tool 110 may include user interface components 112, runtime components 114, auto-mapping recommender 116, data 117, and semantic dictionary 118.

Integration application design tool 110 may allow user 102 to create an integration flow. Two examples of integration flows are provided below. These integration flows are merely exemplary, however, and one skilled in the relevant arts will appreciate that integration flows may perform a vast and expansive array of functions that may differ between individuals and among organizations. Some integration flows may incorporate dozens or even hundreds of assets into the integration scenario.

In one example of an integration flow, user 102 may build an integration scenario that synchronizes data between an enterprise resource planning (ERP) system and a customer relationship management (CRM) system. Such an integration scenario may receive information about a new customer from the CRM system and insert that information into the ERP system to ensure that the two systems stay in synchronization. In this scenario, user 102 may add an asset in integration application design tool 110 that connects to the CRM system and add a second asset in integration application design tool 110 to connect to the ERP system. The resultant integration application may then receive a set of fields from the CRM node and pass these fields via the connection to the ERP system to add the new customer data in the appropriate format and/or through a suitable API.

In a second example of an integration flow, user 102 may build a health and fitness integration application. A first asset in such an integration scenario may connect to a user's watch to retrieve data about the number of steps, e.g., from a pedometer, taken in a day by the watch wearer. In this example, a second asset may record this data into a database server stored on the cloud for record keeping and analytic generation. One skilled in the relevant arts will appreciate that the first asset may include a variety of accessible data fields that may or may not correspond to the data fields used and/or otherwise available within the second asset.

Integration application design tool 110 may further allow user 102 to map fields from a first asset (the source asset) to fields of a second asset (the target asset). In other words, a first asset may use data that may be passed through to a second asset, and user 102 may specify on a field-by-field basis the appropriate association. To continue the exemplary pedometer example described above, consider an exemplary schema representing the fields in the source asset (the watch with a pedometer):

StepDate: smalldatetime
NumberOfSteps: int

The second asset (the cloud-stored database server), could include a database table represented with the exemplary schema:

RelevantDate: date
StepsTaken: big int
TotalDistance: decimal

User 102 may select an appropriate mapping between the first asset and the second asset. User 102 may configure StepDate to link to RelevantDate and NumberOfSteps to link to StepsTaken, with TotalDistance remaining unlinked. By configuring the integration flow thusly, when the integration application executes, it may initialize the fields in the target asset and populate their values using the relevant fields from the source asset.

As described above, for less trivial cases (e.g., where the assets have more than the above two or three fields), this may be an extremely time consuming endeavor for user 102. For such cases, integration application design tool 110 may provide an auto-mapping recommendation, described in further detail below.

User interface components 112 may be employed by integration application design tool 110 to provide components used by integration application design tool 110 to render a user interface for view by user 102 via device 104. User interface components 112 may include a JavaScript user interface library to control dynamic interactions between user 102 and integration application design tool 110. User interface components 112 may include a development toolkit facilitating the building of HTML5 or mobile applications. User interface components 112 may allow a business or organization to upgrade components used by integration application design tool 110 in order to change the experience for user 102 over time.

Runtime components 114 may allow an integration application created via integration application design tool 110 to function at runtime. In one embodiment, runtime components 114 may build, assemble, compile, or otherwise create executable object code based on the specified integration scenario. In another embodiment, runtime components 114 may create interpreted code to be parsed and applied upon execution. Runtime components 114 may connect to ancillary systems to retrieve, store, and manipulate data using an appropriate API or other method. Runtime components 114 may include a variety of intermediary hardware and/or software that runs and processes the output of integration flows.

Auto-mapping recommender 116 may be leveraged by integration application design tool 110 to provide a suggested linking between fields in a source asset and fields in a target asset, i.e. an auto-mapping recommendation. Auto-mapping recommender 116 may deploy a neural network to determine appropriate mappings between a field in a source asset (i.e., the input layer) and a field in a target asset (i.e., the output layer) using a hidden layer and associated weights. Auto-mapping recommender 116 may train the neural network to provide more accurate recommendations over time based on user provided feedback, for example, corrections made by a user to the recommendation, a user acceptance of the recommendation, or a user rejection of the recommendation.

Auto-mapping recommender 116 may suggest mappings to user 102 in a graphical representation. Such a graphical representation may demonstrate connections between the fields of one asset to the fields of the second asset with lines, arrows, or other visual connectors. Auto-mapping recommender 116 may further translate recommended mappings into a script in an expression or scripting language. Such translation is advantageous because user 102 may view an alternate, textual form of the recommendation and make modifications therein. Moreover, the script may subsequently be executed at runtime to link the source fields and target fields. Additionally, the script may be updated, either manually by user 102 or by auto-mapping recommender 116, to perform additional data transformations. For example, a smalldatetime field may be translated to a date field, a long integer transformed into a floating point number, etc. The form and function of auto-mapping recommender 116 is described in further detail with reference to FIGS. 2A-2D.

Data 117 may be any of a panoply of data storage systems housing information relevant to, used in, and stored by integration application design tool 110 including information about designed integration scenarios, available assets for deployment, connections, a neural network employed by auto-mapping recommender 116, etc. For instance, data 117 may be a database management system or relational database tool. Data 117 may further be a message queue or stream processing platform such as Apache Kafka or Apache Spark or other data storage systems like Apache Hadoop, HDFS, or Amazon S3, to name just some examples. Data 117 may be a data lake, data silo, semi-structured data system (CSV, logs, xml, etc.), unstructured data system, binary data repository, or other suitable repository. Data 117 may store thousands, millions, billions, or trillions (or more) of objects, rows, transactions, records, files, logs, etc. while allowing for the creation, modification, retrieval, archival, and management of this data. In an embodiment, data 117 uses scalable, distributed computing to efficiently catalog, sort, manipulate, and access stored data.

Semantic dictionary 118 may be used by auto-mapping recommender 116 and/or integration application design tool 110 to determine relationships between fields within source assets and the target assets. In one embodiment, semantic dictionary 118 may map words to other words exhibiting similar meaning. For example, a field name of "UserName" may be mapped in semantic dictionary 118 to a field name of "LoginName." Thus, semantic dictionary 118 may allow auto-mapping recommender 116 to identify matches among fields in a manner exceeding mere syntactic equivalence. Semantic dictionary 118 may further include a linguistic corpus or additional annotations used to link field names between assets and to derive meaning from and make connections between the fields and across disparate assets.

Systems 120, such as system 120A, system 120B, and system 120C, may be an API, data source or other technical resource or system to be included in an integration flow. Systems 120 may house data in a number of fashions, such as in a suitable data repository, either in a raw form or following (or at an intermediate step within) the application of a transformational capability. Systems 120 may include data lakes, data silos, message streams, relational databases, semi-structured data (CSV, logs, xml, etc.), unstructured data, binary data (images, audio, video, etc.), or other suitable data types in appropriate repositories, both on-premises and on the cloud. Just for example, systems 120 may provide data or functionalities by connecting to a CRM system, an ERP system, a database, an internet-Of-Things device, a mobile phone, a watch, a JIRA tasklist, a revision control system or other code management tool, and/or a multitude of other sources.

Figure 2A:
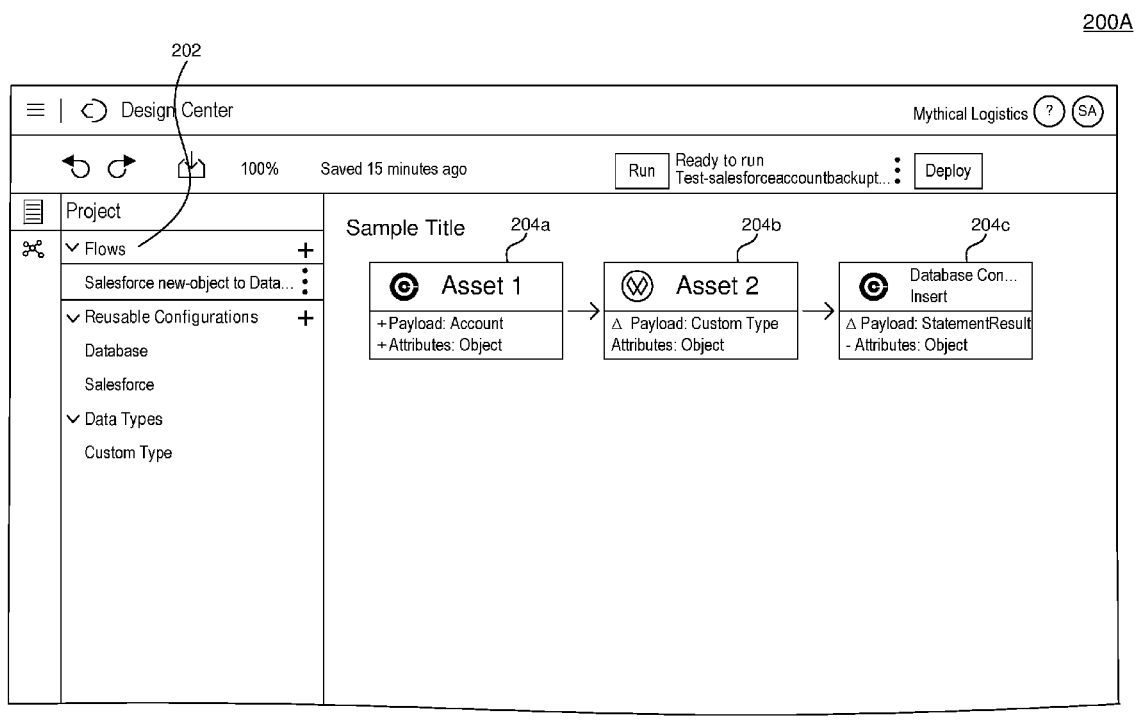
FIGS. 2A-2D are example screen displays of an integration flow design tool incorporating an auto-mapping recommender, according to some embodiments.

FIG. 2A is example screen display 200A of an integration flow design tool, according to some embodiments. Screen display 200A portrays an overview of an integration flow. The screen display provided in FIG. 2A is merely exemplary, and one skilled in the relevant art(s) will appreciate that many approaches may be taken to provide a suitable screen display 200 in accordance with this disclosure. Screen display 200A may include navigation bar 202 and assets 204.

Navigation bar 202 may provide abilities for user 102 to maneuver between and among screens and flows in integration application design tool 110. Navigation bar 202 may include links, textual indicator, graphical indicators, and appropriate combinations thereof. For example, navigation bar 202 may display integration flows accessible by user 102, previously deployed configurations, common data types, tools for use in designing an integration flow, etc.

Assets 204, for example asset 204*a*, asset 204*b*, and asset 204*c* may represent disparate technical resources. Assets 204 may connect to data sources within an organization's enterprise landscape or assets 204 may connect to cloud-stored data sources. Assets 204 may be pre-built and allow an integration flow to connect to a particular data source or employ a particular data protocol. Assets 204 may contain fields used by the underlying asset. Assets 204 may include a type, for example, an indication that the asset connects to a particular type of data source (e.g., a SQL Server instance).

Figure 2B:
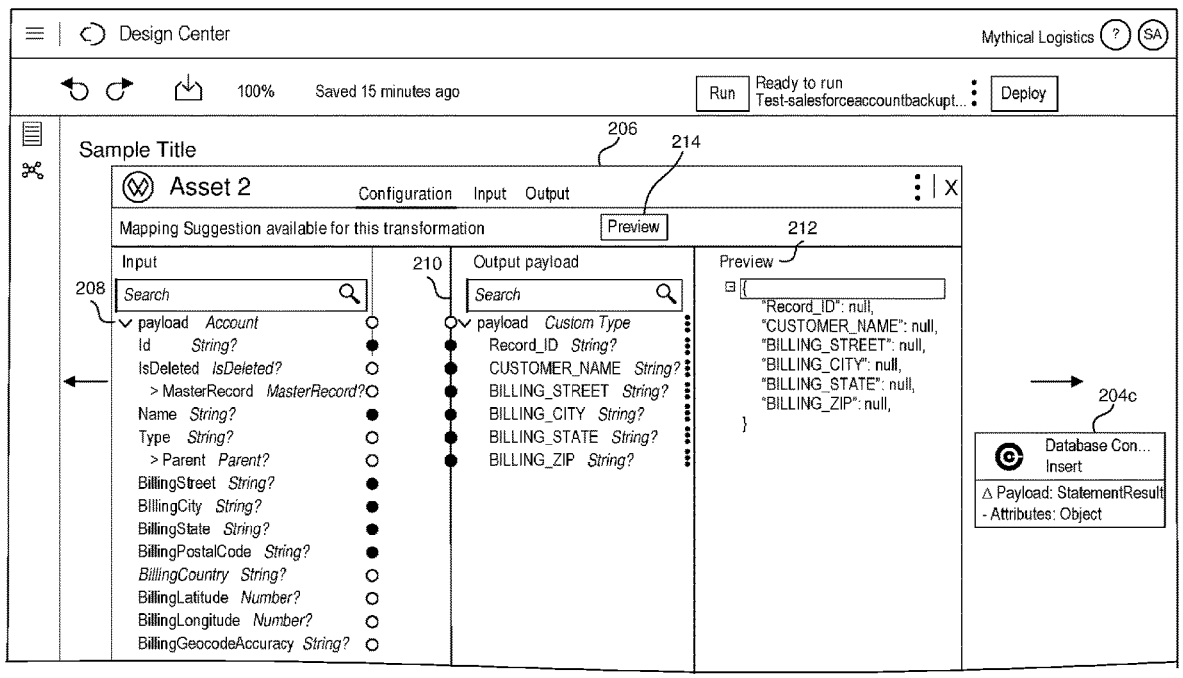

FIG. 2B is example screen display 200B of an integration flow design tool incorporating an auto-mapping recommender, according to some embodiments. Screen display 200B portrays an integration flow with detailed information displayed about asset 204B. The screen display provided in FIG. 2B is merely exemplary, and one skilled in the relevant art(s) will appreciate that many approaches may be taken to provide a suitable screen display 200B in accordance with this disclosure. Screen display 200B may include details 206, source fields 208, target fields 210, script 212, and preview button 214.

Details 206 may display additional information about a particular asset, such as asset 204B. In one embodiment, user 102 may have clicked asset 204B to load details 206, but many forms of interaction may be used to load or transition to details 206. Details 206 may display a variety of information about asset 204B including source fields 208, target fields 210, and script 212. This list is non-exhaustive, however, and a wide-array of additional information may be included in details 206 including: server addresses, security/account information, transport/message protocol parameters, and a litany of other configurations. Moreover, the particular information and data displayed in details 206 may vary based on the type of asset being examined.

Source fields 208 may be fields passed to an asset from another asset. In the exemplary screen display 200B, source fields 208 may be fields passed in from asset 204a. In this example, source fields 208 include a variety of fields: "Id," "IdDeleted," "MasterRecord," "Name," "Type," "Parent," "BillingStreet," "BillingCity," "BillingState," "BillingPostalCode," "BillingCountry," "BillingLatitude," "BillingLongitude," and "BillingGeocodeAccuracy."

Target fields 210 may be the fields used within assets 206. Target fields 210 may be thought of as variables or placeholders for values used within the current asset. In the exemplary screen display 200B, target fields 210 include: "Record_ID," "CUSTOMER_NAME," "BILLING_STREET," "BILLING_CITY," "BILLING_STATE," and "BILLING_ZIP."

Script 212 may display a mapping between source fields 208 and target fields 210 in an expression language. In the example provided by screen display 200B, none of the fields in target fields 210 have been mapped, and therefore, the script reflects "null" mappings. In some embodiments, user 102 may edit script 212 directly to create an appropriate mapping between fields. Here, a scripting language resembling is displayed, with colons separating the field mapping, but any suitable text-based expression language may be employed to represent the auto-mapping recommendation.

Preview button 214 may allow user 102 to trigger an auto-mapping recommendation from source fields 208 to target fields 210. By clicking or otherwise engaging preview button 214, user 102 may receive an auto-mapping recommendation from auto-mapping recommender 116. Such an auto-mapping recommendation, i.e., a subsequent exemplary screen display transitioned to after preview button 214 is engaged, is described below with reference to FIG. 2C.

Figure 2C:
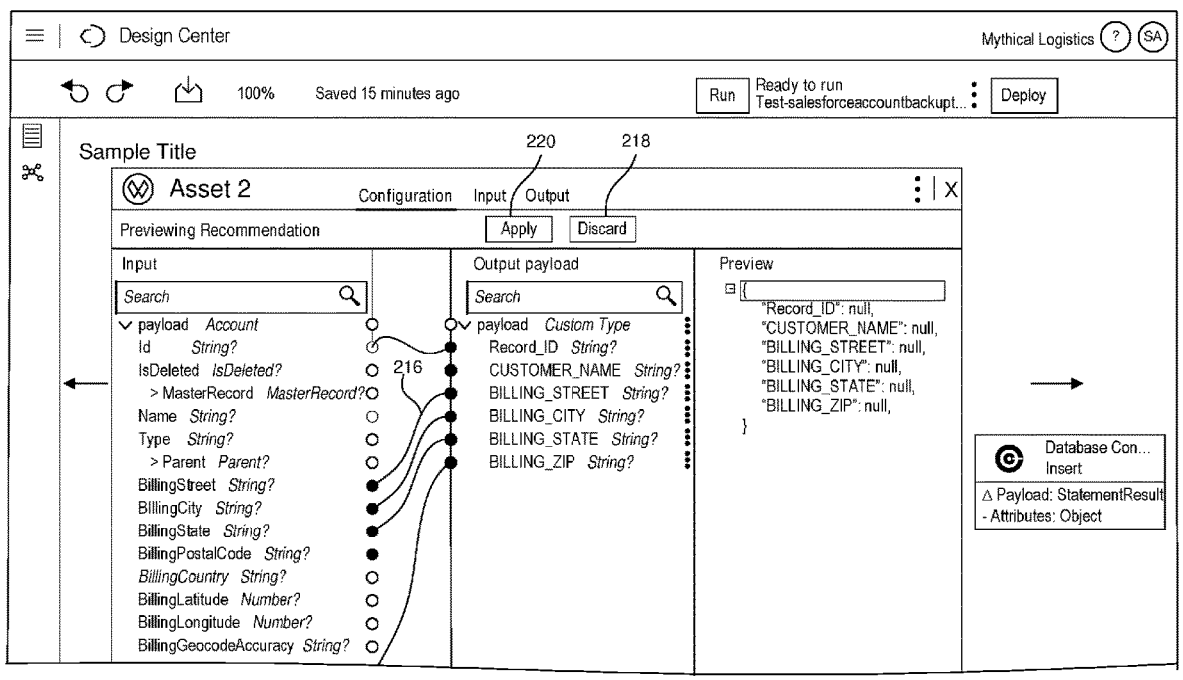

FIG. 2C is example screen display 200C of an integration flow design tool incorporating an auto-mapping recommender, according to some embodiments. Screen display 200C portrays an integration flow with an auto-mapping recommendation provided to the viewer. The screen display provided in FIG. 2C is merely exemplary, and one skilled in the relevant art(s) will appreciate that many approaches may be taken to provide a suitable screen display 200C in accordance with this disclosure. Screen display 200C may include mapping 216, discard button 218, and apply button 220.

Mapping 216 may display a graphical representation of the auto-mapping recommendation suggested by auto-mapping recommender 116. Mapping 216 may connect the fields of the source asset to the fields of the target asset using one or more lines, arrows, or other visual links. In the exemplary screen display 200C, "Id" is connected to "Record_ID," "BillingStreet" is connected to "BILLING_STREET", "BillingCity" is connected to "BILLING_CITY", "BillingState" is connected to "BILLING_STATE", etc.

Discard button 218 may allow user 102 to undo or rollback the auto-mapping recommendation, restoring the links between the fields of assets 206 to an appropriate setting from prior to preview button 214 being engaged.

Apply button 220 may allow user 102 to accept the auto-mapping recommendation. Accepting the auto-mapping recommendation may formalize the recommended links between source fields 208 and target fields 210. The result of pressing apply button 220 is described in further detail below with reference to FIG. 2D.

Figure 2D:
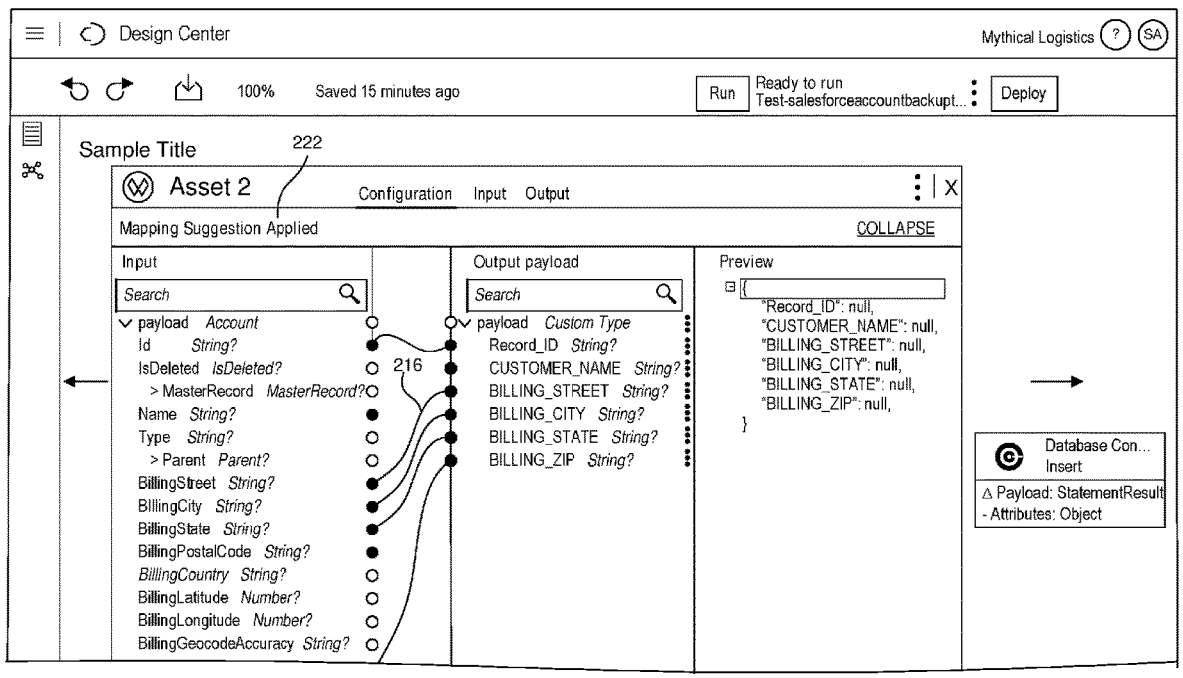

FIG. 2D is example screen display 200D of an integration flow design tool incorporating an auto-mapping recommender, according to some embodiments. Screen display 200C portrays an integration flow after an auto-mapping recommendation was applied. The screen display provided in FIG. 2D is merely exemplary, and one skilled in the relevant art(s) will appreciate that many approaches may be taken to provide a suitable screen display 200D in accordance with this disclosure. Screen display 200D may include confirmation 222.

Confirmation 222 may provide user 102 with a textual confirmation that the auto-mapping recommendation was applied. In this exemplary embodiment, a message reading "Mapping Suggestion Applied!" displays, however, any suitable message may be displayed. Additionally, mapping 216 may be updated with a different color, bolding, or other visually distinguishing characteristic to alert user 102 that the recommendation was applied. Integration application design tool 110 may also update script 212 to display the applied recommendation in an expression language. When the auto-mapping recommendation is applied, integration application design tool 110 may store relevant information, e.g., the resultant script, in data 117 in association with source fields 208 and/or target fields 210.

Figure 3:
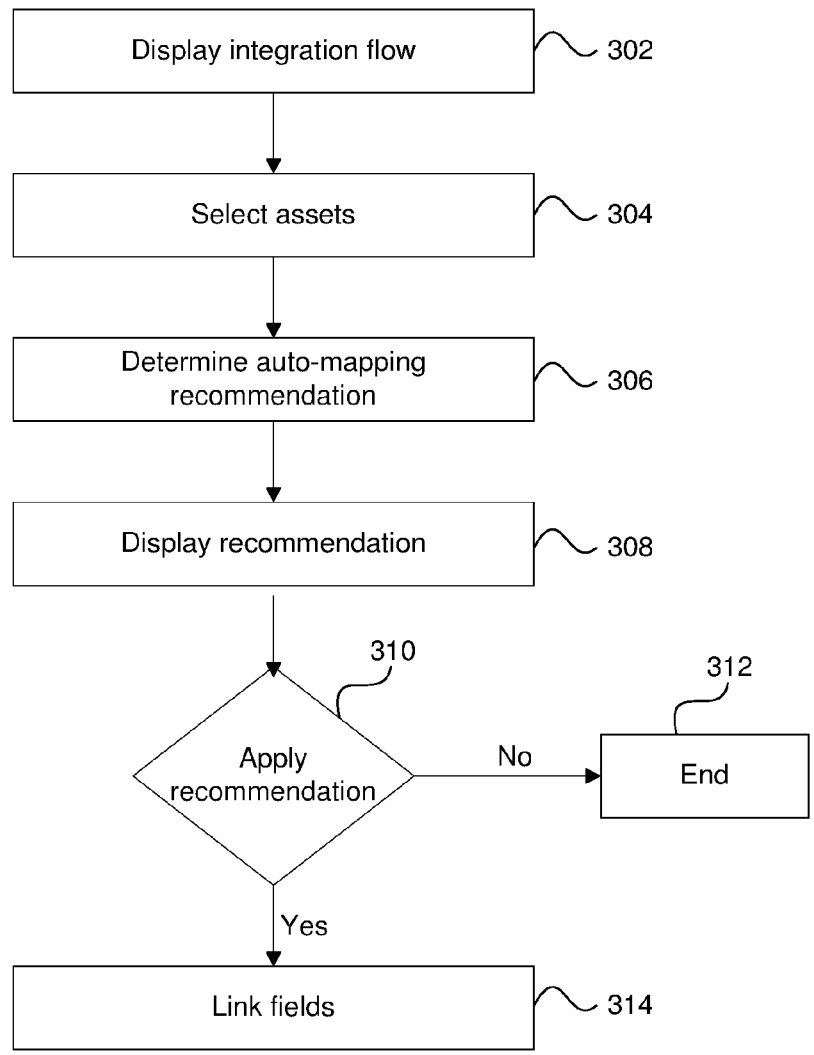
FIG. 3 illustrates a method for applying an auto-mapping recommendation in an integration flow design tool, according to some embodiments.

FIG. 3 illustrates a method 300 for applying an auto-mapping recommendation in an integration flow design tool, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, integration application design tool 110 may display an integration flow for user 102. Integration application design tool 110 may receive a selection of an integration flow to display from user 102, e.g., from a selection within navigation bar 202. Integration application design tool 110 may allow user 102 to create a new integration flow. Integration application design tool 110 may load any required information about the integration flow from data 117. Such information may include the assets contained within the integration flow, connections between the assets, configuration information about the assets or integration flow, previously defined field mappings, and any other suitable information. In one embodiment, integration application design tool 110 may display the integration flow in graphical form as described above with reference to FIG. 2A. However, other embodiments may display the integration flow in other suitable fashions. Integration application design tool 110 may also provide components to allow user 102 to add additional assets into the flow, insert programming constructs, update configuration information, etc.

In 304, integration application design tool 110 may display detailed configuration information, such as details 206, for an asset. Integration application design tool 110 may display details 206 in response to a user selection of a particular asset. Details 206 may include fields received from a source asset, i.e., source fields 208, fields used by the target asset, i.e., target fields 210, script 212, preview button 214, and other appropriate information. In one embodiment, the user-selected asset may display as the target asset in details 206. Integration application design tool 110 may display detailed information as described above with reference to FIG. 2B. However, other embodiments may display the integration flow in other suitable fashions.

In 306, integration application design tool 110 may employ auto-mapping recommender 116 to formulate an auto-mapping recommendation that provides a suggested linking between fields in a source asset and a target asset. Auto-mapping recommender 116 may apply a syntactic analysis of the fields to determine if there are any exact matches or near matches among the fields and include these matches within the recommendation. Auto-mapping recommender 116 may further determine semantic similarity between fields by using and maintaining semantic dictionary 118. Auto-mapping recommender 116 may also deploy a neural network to determine appropriate mappings between source fields 208 and target fields 210 based on determinations made in the past, user responses to those determinations, and other suitable information. The auto-mapping recommendation may link one field in the source asset to one field in the target asset or multiple fields in the source asset to multiple sources in the target asset. In some embodiments, one field in the source asset may link to multiple fields in the target asset.

In 308, integration application design tool 110 may display the recommendation for user 102. Integration application design tool 110 may provide the auto-mapping recommendation in a graph form, such as described above with reference to FIG. 2C as mapping 216. In an embodiment, integration application design tool 110 may demonstrate connections between the fields of one asset to the fields of the second asset with lines, arrows, or other visual connectors. Integration application design tool 110 may further translate the suggested mappings into a script, such as described above with reference to FIG. 2B as script 212.

In 310, integration application design tool 110 may determine if the recommendation should be applied. If no, i.e., user 102 elected not to apply the auto-mapping recommendation, then method 300 may proceed to 312. If yes, user 102 chose to apply the auto-mapping recommendation, then method 300 may proceed to 314.

In 312, integration application design tool 110 may discard the recommendation and await further input from user 102, ending method 300.

In 314, integration application design tool 110 may formalize the link between source fields 208 and appropriate target fields 210, i.e. apply the auto-mapping recommendation. Integration application design tool 110 may store appropriate information related to the linkages within data 117. By finalizing the links between source fields 208 and target fields 210, when executing, the integration application may initialize the fields in the target asset and populate the values of the target fields using the relevant fields passed from the source asset.

Figure 4:
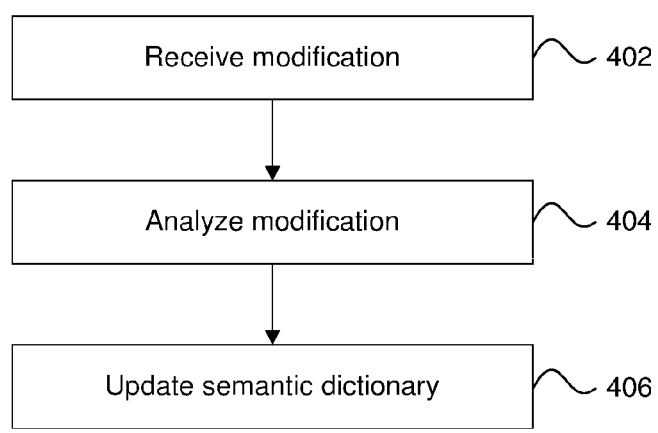
FIG. 4 illustrates a method for improving auto-mapping recommendations in an integration flow design tool, according to some embodiments.

FIG. 4 illustrates a method 400 for improving auto-mapping recommendations in an integration flow design tool, according to some embodiments.

Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, integration application design tool 110 may receive a modification from user 102 to the recommendation made by auto-mapping recommender 116 and displayed for user 102, as described above with reference to FIG. 3. In an embodiment, user 102 may click on a connection, i.e., a line between two fields in mapping 216, and move that connection to a different field among source fields 208 or a different field among target fields 210. Or user 102 may modify the translated script, i.e., script 212, to adjust the mapping between source fields 208 and target fields 210. For example, user 102 may receive an auto-mapping recommendation that connects "UserName" from a first asset to "User Name" in a second asset. User 102 may understand that "UserName" actually corresponds to a field named "LoginName" in the second asset. User 102 may adjust the auto-mapping recommendation based on this knowledge.

In 404, integration application design tool 110 may analyze the modification made by user 102 to determine a conclusion about the modification. Integration application design tool 110 may employ a variety of suitable intent recognition techniques to achieve this. In the illustrative above example, integration application design tool 110 may determine that the fields names "LoginName" and "UserName" may be synonyms.

In 406, integration application design tool 110 may update semantic dictionary 118 based on the conclusion derived in 404 to apply the change to future auto-mapping recommendations. For example, integration application design tool 110 may include an additional synonym for "UserName" of "LoginName." Accordingly, the next time that an auto-mapping recommendation is provided for a field of "UserName," auto-mapping recommendation 116 may consider "LoginName" as a potential candidate.

Figure 5:
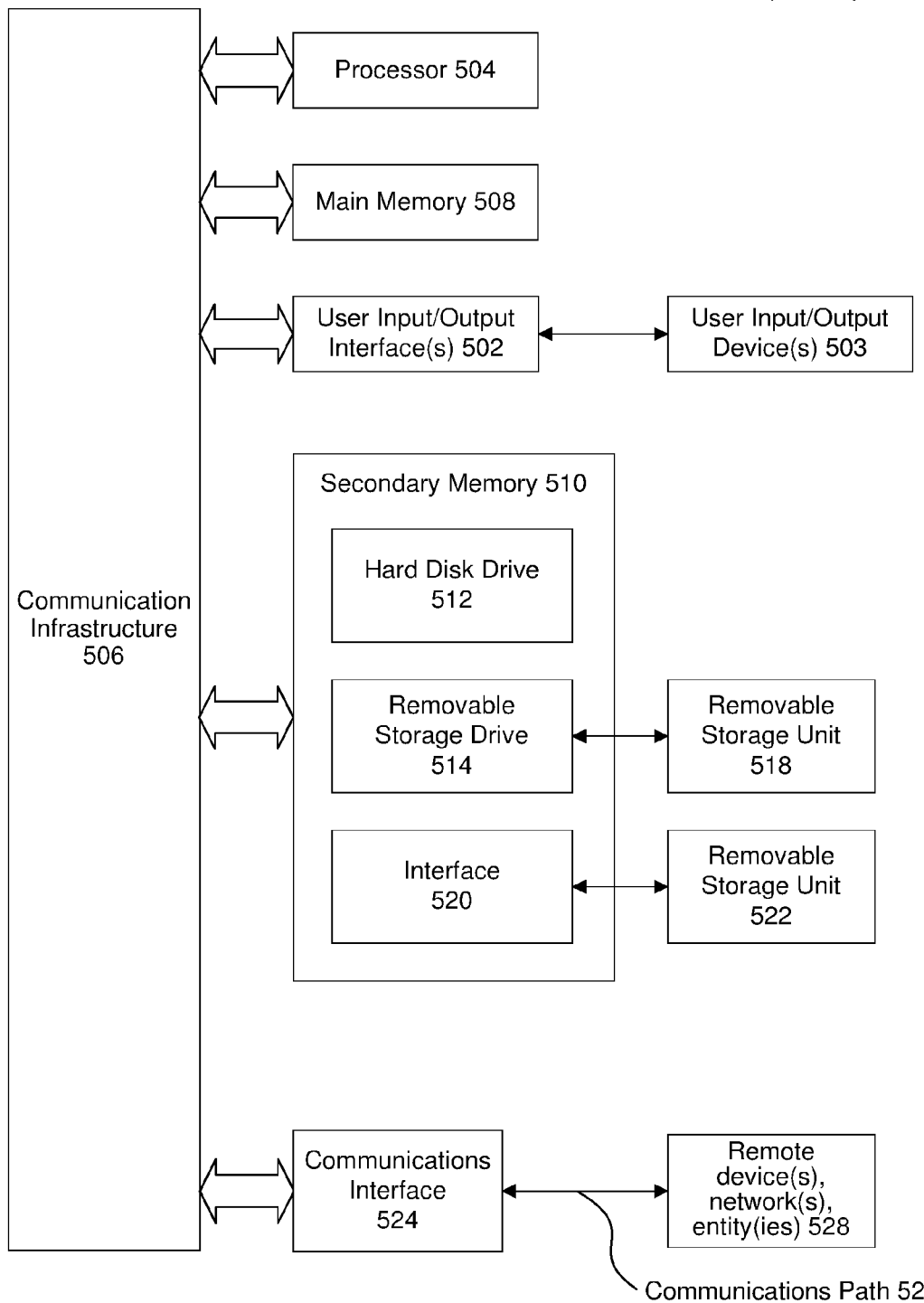
FIG. 5 illustrates a computer system, according to exemplary embodiments of the present disclosure.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   displaying, by an integration flow design tool, an integration flow comprising a source asset and a target asset, wherein the source asset sends one or more source fields to the target asset as one or more target fields when the integration flow is executed;
   determining, by the integration flow design tool, an auto-mapping recommendation using a neural network, wherein the auto-mapping recommendation suggests a mapping from the one or more source fields to the one or more target fields, and wherein the mapping links a source field in the one or more source fields and a target field in the one more target fields; and
   rendering, by the integration flow design tool, the auto-mapping recommendation in a graphical representation,
   wherein at least one of the displaying, determining, and rendering are performed by one or more computers.

2. The method of claim 1, further comprising:
   receiving, by the integration flow design tool, a command to apply the auto-mapping recommendation; and
   passing, by the integration flow design tool, the source field to the target asset to populate the target field when the target field is initialized when the integration flow executes.

3. The method of claim 1, further comprising:
   receiving, by the integration flow design tool, a user modification to the auto-mapping recommendation; and
   training, by the integration flow design tool, the neural network with the user modification to improve future recommendations.

4. The method of claim 1, further comprising:
   receiving, by the integration flow design tool, a discard indicator to the auto-mapping recommendation; and
   training, by the integration flow design tool, the neural network based on the discard indicator to improve future recommendations.

5. The method of claim 1, further comprising:
   translating, by the integration flow design tool, the auto-mapping recommendation into a script in an expression language; and
   displaying, by the integration flow design tool, the script in association with the auto-mapping recommendation.

6. The method of claim 5, further comprising:
   receiving, by the integration flow design tool, an edit to the script;
   applying, by the integration flow design tool, the edit to the auto-mapping recommendation; and
   re-rendering, by the integration flow design tool, the graphical representation of the auto-mapping recommendation based on the edit.

7. The method of claim 1, wherein the auto-mapping recommendation further suggests a data transformation between the target field and the source field.

8. The method of claim 1, the determining further comprising:
   applying, by the integration flow design tool, a semantic dictionary to map the source field to the target field.

9. A system, comprising:
   a memory; and
   at least one processor coupled to the memory and configured to:
   display an integration flow comprising a source asset and a target asset in an integration flow design tool, wherein the source asset sends one or more source fields to the target asset as one or more target fields when the integration flow is executed;
   determine an auto-mapping recommendation using a neural network, wherein the auto-mapping recommendation suggests a mapping from the one or more target fields to the one or more source fields, and wherein the mapping links a source field in the one or more source fields and a target field in the one more target fields; and
   render the auto-mapping recommendation in a graphical representation.

10. The system of claim 9, the at least one processor further configured to:
    receive a command to apply the auto-mapping recommendation; and
    pass the source field to the target asset to populate the target field when the target field is initialized when the integration flow executes.

11. The system of claim 9, the at least one processor further configured to:
    receive a user modification to the auto-mapping recommendation; and
    train the neural network with the user modification to improve future recommendations.

12. The system of claim 9, the at least one processor further configured to:
    receive a discard indicator to the auto-mapping recommendation; and
    train the neural network based on the discard indicator to improve future recommendations.

13. The system of claim 9, the at least one processor further configured to:
    translate the auto-mapping recommendation into a script in an expression language; and display the script in association with the auto-mapping recommendation.

14. The system of claim 13, the at least one processor further configured to:
    receive an edit to the script;
    apply the edit to the auto-mapping recommendation; and
    re-render the graphical representation of the auto-mapping recommendation based on the edit.

15. The system of claim 9, wherein the auto-mapping recommendation further suggests a data transformation between the target field and the source field.

16. The system of claim 9, wherein to determine the auto-mapping recommendation, the at least one processor is further configured to:
    apply a semantic dictionary to map the source field to the target field.

17. A non-transitory computer-readable medium having instructions stored thereon that, when executed by at least one computing device, causes the at least one computing device to perform operations comprising:
    displaying an integration flow comprising a source asset and a target asset in an integration flow design tool, wherein the source asset sends one or more source fields to the target asset as one or more target fields when the integration flow is executed;

determining an auto-mapping recommendation using a neural network, wherein the auto-mapping recommendation suggests a mapping from the one or more source fields to the one or more target fields, and wherein the mapping links a source field in the one or more source fields to a target field in the one more target fields; and rendering the auto-mapping recommendation in a graphical representation.

18. The non-transitory computer-readable medium of claim 17, the operations further comprising:

receiving a command to apply the auto-mapping recommendation; and passing the source field to the target asset to populate the target field when the target field is initialized when the integration flow executes.

19. The non-transitory computer-readable medium of claim 17, the operations further comprising:

translating the auto-mapping recommendation into a script in an expression language; and displaying the script in association with the auto-mapping recommendation.

20. The non-transitory computer-readable medium of claim 17, wherein the auto-mapping recommendation further suggests a data transformation between the target field and the source field.

* * * * *